Sept. 3, 1968     W. J. MITSCHANG     3,399,935
ANTIFRICTION BEARINGS
Filed May 16, 1967
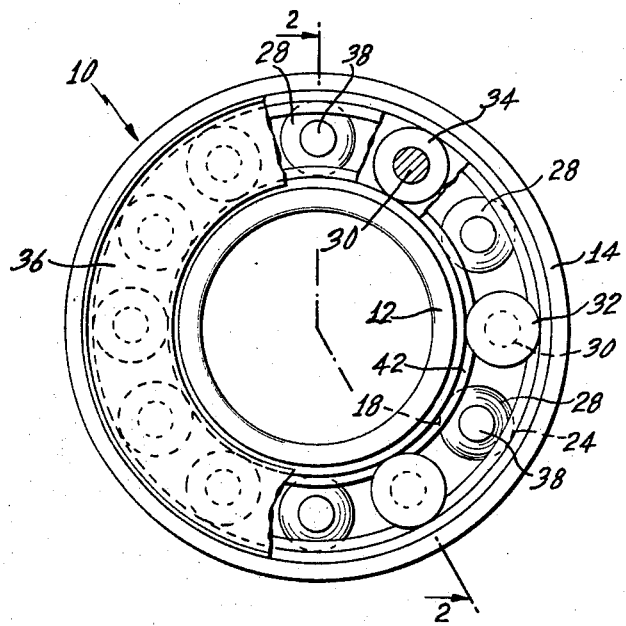
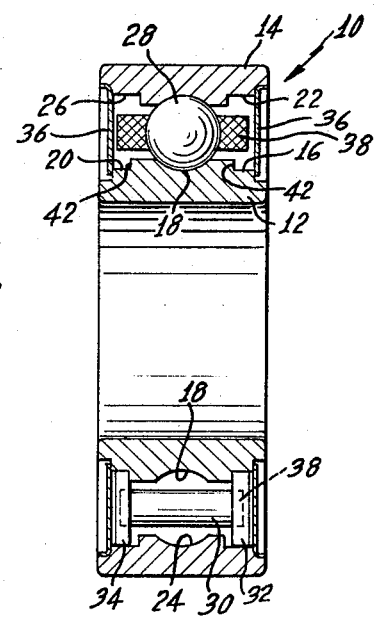
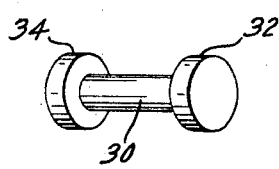
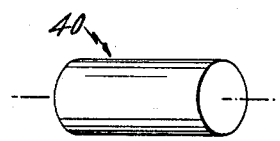
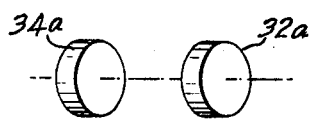
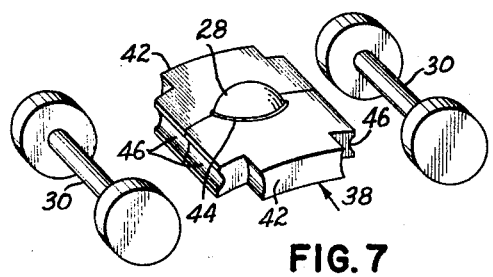
INVENTOR.
William J. Mitschang
BY Jerome Bauer
ATTORNEY

United States Patent Office 3,399,935
Patented Sept. 3, 1968

3,399,935
ANTIFRICTION BEARINGS
William J. Mitschang, 7 Rose St.,
Glen Head, N.Y. 11545
Continuation-in-part of application Ser. No. 461,039,
June 3, 1965. This application May 16, 1967, Ser.
No. 648,517
3 Claims. (Cl. 308—200)

ABSTRACT OF THE DISCLOSURE

Antifriction bearings having sets of equal diameter roller bearing and ball bearing elements; the sets of roller and ball bearing elements being arranged in circumferentially spaced relationship about the antifriction bearing while spacing means retain the spaced sets of roller and ball bearing elements relatively spaced from each other with the roller bearing set of elements in bearing engagement with a respective race and the ball bearing set of elements in bearing engagement with another respective race.

---

This invention relates to antifriction bearings.

This application is a continuation-in-part of application Ser. No. 461,039, filed June 3, 1965, which is now abandoned.

The life of an individual antifriction bearing is defined as the number of revolutions which the bearing runs before the first evidence of fatigue develops in the material of either race member or ring or in any of the rollabe elements. The rated life of a group of identical antifriction bearings is defined as the number of revolutions that ninety percent of a group of bearings will complete or exceed before the first evidence of fatigue develops. The basic load rating of an antifriction bearing is that constant stationary radial load which a group of apparently identical roller bearings with stationary outer rings or races can endure for a rating life of one million revolutions of the inner race or ring, the load in this case being purely radial.

In any antifriction bearing, the specific cause for limiting the life is due to the number of stress cycles that the material can withstand without failure. In the case of a stationary outer ring, it is this ring which will receive the greatest amount of stress cycles. This will usually start at the area of the ring which transfers the heaviest load to the rollable bearing elements.

The desideratum of the present invention is to minimize the number of stress cycles one small area of either race member or ring will receive in any amount of revolutions as compared to the standard antifriction bearing.

Another object of the invention is to provide an antifriction bearing that alternately uses rollable antifriction bearings of a combination of ball and roller elements so that the area of the race member or ring that transfers loads through the rollable elements is constantly changing instead of remaining fixed as is the case with a regular antifriction bearing having identical rolling elements.

Still another object is to provide an antifriction bearing in which the ball elements transfer both radial and axial loads from one race member to the other through the central or middle of the members while the roller elements transfer radial loads through the races positioned at the outer sides of such members, thereby insuring that the same surface area of the race members will receive only half the number of stress cycles that a regular antifriction bearing will receive when the same number of rollable elements are employed. This object and feature of the invention distinguishes from such prior art devices as Perkins Patent No. 1,415,694, Seubert Ser. No. 621,-376, George Ser. No. 796,995, Bronander Patent No. 1,510,920, Brownlee Patent No. 1,877,486, Reed Patent No. 2,004,013 or Large Patent No. 2,040,489, none of which is capable of satisfying the problems solved hereby.

The patent to Simmons No. 2,581,722 is directed to a similar bearing structure as that of the present invention but is incapable of operating as a true antifriction bearing at reasonable operating speeds. During operation, the rollers and balls of the Simmons patent rotate in counter directions. Because they are not spaced from each other, they engage and rub against one another until they create sufficient friction to wedge themselves together. In so wedging they also wedge themselves between their bearing race surfaces such that they then lock between themselves and between their respective bearing race surfaces to prevent the race surfaces from rotating relative to each other. This is a result that is contrary to the desired purpose of antifriction bearings.

Other and further objects of this invention reside in the structures and arrangements hereinafter more fully described with reference to the accompanying drawing in which:

FIG. 1 is a side elevational view of an antifriction bearing constructed according to the invention, FIG. 2 is a cross-section of FIG. 1 taken along lines 2—2, FIG. 3 is a perspective view of a roller bearing element, FIG. 4 is a view of a ball bearing element, FIG. 5 is a perspective view of another roller bearing element, FIG. 6 is a perspective view of still a further roller bearing element, and FIG. 7 is a perspective view of means for retaining the ball and roller bearing elements relatively spaced.

Description

Referring now to the drawing, the numeral 10 generally identifies an antifriction bearing that comprises an inner race member or ring 12 and an outer race member or ring 14. The inner race member or ring 12 is provided with a plurality of race surfaces 16, 18 and 20. The race surface 18 is positioned substantially centrally or midway between the inner race member 12 whereas, the race surfaces 16 and 20 are placed on adjacent or opposite sides of the middle race surface 18. In like manner, the outer race member 14 is provided with mating or complementary race surfaces 22, 24 and 26. Here again, the outside race surfaces 22 and 26 are positioned on opposite sides of the middle or centrally located race surface 24.

When the inner and outer race members 12 and 14 are placed in their circumposed relationship as shown in FIGS. 1 and 2, their set of central or middle race surfaces 18 and 24 are aligned with each other to form a raceway. In like manner, their set of outside surfaces 16 and 22 form another raceway while the set of surfaces 20 and 26 form still a further raceway because each of these sets of surfaces are radially and axially aligned with each other.

In carrying forth the inventive concept, it is to be noted that the diameters of each of the race surfaces 16, 18 and 20 are all equal while the diameters of each of the race surfaces 22, 24 and 26 are also equal with each other. Hence, when the ring members 12 and 14 are circumposed as shown in the drawing, they define the plurality of raceways between their sets of surfaces 16 and 22, 18 and 24 and 20 and 26, each of such raceways being of equal size and diameter. In consequence, the surfaces of the inner race member 12 will be equally spaced from each respective one of the surfaces of the outer race member 14, and vice versa.

Positioned within and between the race surfaces 18 and 24 that define the middle or central raceway are a plurality of rollable elements in the form of spheroids or balls 28, as seen more clearly in FIGS. 2 and 4. As is the practice in antifriction bearings, each of the rollable elements 28 are of equal diameter so that they constantly engage with the race surfaces of their raceway. It will be noted from FIG. 2 that each of the ball bearing elements 28 in the raceway 18–24 conformingly engage with a portion of such raceway surfaces. This is accomplished by curving the surfaces 18 and 24 such that they conform at least partially to the contour of the spherical elements 28, thereby enabling relative engagement between the bearing elements 28 and the conformingly contoured portions of the surfaces 18 and 24. This conforming relationship between the race surfaces 18 and 24 and that of the bearing elements 28 enables the bearing elements 28 to support, not only a radial load that may be applied to either race member 12 or 14, but as well, an axial load that may be applied thereto. Thus, the spherical bearing elements 28 perform the dual function of providing axial as well as radial support of any load that may be applied to either race member 12 or 14.

The additional raceways 16–22 and 20–26 positioned on opposite sides of the middle raceway 18–24 are also adapted to receive and contain a set of rollable bearing elements that are roller shaped such as is shown in greater detail in FIGS. 3, 5 and 6. However, for purposes of explanation at the present time and to provide a clearer understanding of the invention, reference will now be had to the roller elements as depicted in FIGS. 2 and 3.

The roller elements shown in FIGS. 2 and 3 may be said to be dumbbell shaped in that they comprise a central crossbar 30 that is of substantially reduced diameter, but which extends laterally to connect together at its opposite ends a pair of relatively spaced roller shaped bearing elements 32 and 34. The elements 32 and 34 are of equal diameter and, in fact, their diameters are equal respectively to the space between the race surfaces of the inner race member 12 and those of the outer race member 14. Thus, for example, the roller shaped element 32 is adapted to be engaged with the surfaces 16 and 22 of the raceway defined therebetween whereas, the roller shaped element 34 is adapted to be positioned in and engaged with the surfaces 20 and 26 that define the opposite side raceway 20, 26.

Inasmuch as all of the raceway surfaces are equally spaced from each other and because the roller shaped elements 32 and 34 are of equal diameter, they are equal in diameter also to that of the spherical or ball bearing elements 28. Thus, it will be clear to those skilled in the art that any load applied to either the inner or outer race members 12 or 14 will be shared and supported equally by the roller shaped elements 32 and 34 and the ball bearing elements 28, if such load is directed radially. In consequence, as each race member 12 and 14 rotates relative to the oeher, all of the rollable elements 32, 34 and 28 rotate at the same speed. However, in the present arrangement, because the crossbar 30 interconnects the roller elements 32 and 34 with each other, such roller elements rotate as a unit.

As is the practice in antifriction bearings, the opposite sides are closed by sealing structures 36 that prevent the entry and accumulation of dirt and other deleterious substances between the races. The rollable elements 28, 32 and 34 are retained in their respective races by a spacer or cage structure identified by the numeral 38. The spacer or caging structure performs the function of enabling the bearing to operate at high speeds and at extremely high loads while assuring that the bearing elements will not touch each other and, therefore, will not frictionally engage each other to prevent the proper operation of the antifriction bearing.

At all operating speeds, the alternately arranged bearing elements are counter rotating. That is to say, even though the bearing elements all rotate in the same general direction at any given moment, the underside of one bearing element is moving upward while the upper side of the next adjacent bearing element is moving downward toward it. This means that at all times the surfaces of the bearing elements are also in relative counter rotation. In consequence, if these surfaces are permitted to touch each other during such counter rotation, they wedge together tightly against each other as in the bearing of that disclosed in the patent to Simmons, No. 2,581,722. This creates a wedging lock between the bearing elements and also between the races against which the same engage and thus overcome the benefits of a true antifriction bearing.

To avoid this, the bearing elements are conveniently retained loosely in relative spaced alternate relationship by the structure 38 which may comprise a plurality of two-part spacer members 42 that are curved approximately to the contour of the space between the inner and outer race members 12 and 14. A through aperture 44 is provided to loosely receive and cage the ball elements 28 while the ends of the member 42 are curved as at 46 to conformingly and loosely accommodate the curvature of the crossbar 30 of the dumbbell bearing elements in the manner shown in FIG. 7. Thus, each spacer member 42 is loosely positioned between circumferentially spaced ones of the roller bearing elements while caging the ball bearing elements alternately positioned between them.

The result is an alternating arrangement of balls and rollers each relatively spaced from the other by the spacer structure 38. In practice, the spacer structure 38 loosely cages the ball elements 28 and also loosely cages the roller elements to permit them sufficient play to seek their own seats. Thus, in use the roller elements are able to tilt or skew about their axes thereby preventing binding or wedging that may occur between the flat or axial sides of the roller ends 32 and 34 and the flat adjacent radial walls or surfaces 41 provided on their respective races As an aid in this effort, it will be noted from FIG. 2 that although the ends 32 and 34 seat axially against the facing walls of their inner races 16 and 20 at 41, the outer races 22 and 26 are of greater axial extent than that of the ends 32 and 34. In consequence, if during rotation any one of the roller bearing elements should twist or skew about its axis, it is permitted this movement without binding or locking against and between the radial walls 41 of its races.

The ball and roller bearings are assembled or loaded between their respective races as taught in the United States application to Conrad Ser. No. 822,723. That is to say, the inner ring is placed eccentrically within the outer ring and the bearing elements are then inserted between the large eccentric space resulting between the races of such rings. The use of the dumbbell shaped rollable elements 30 having the integral ends 32 and 34 produces an unusually excellent construction. In the use of the dumbbell shaped rollable elements 30, 32 and 34, the crossbar 30 thereof extends across from one side raceway to the opposite side raceway and may, itself, function as a spacer cage in place of the spacing cage element 38 to retain the ends 32 and 34 spaced axially.

The dumbbell shaped roller bearing elements 30, 32, 34 performs an extremely useful and beneficial function. Because of the narrowed interconnecting section 30 of such roller member, it is possible to include the ball bearing elements 28 between the enlarged roller shaped ends 32 and 34, thereby enabling a larger number of ball bearing elements 28 to be included within the construction of the antifriction bearing 10 than is capable of being utilized in prior art bearings.

The arrangement of bearing elements as illustrated in FIGS. 1 and 2 is such that the ball bearing elements 28 engaged within their middle or central raceways 18–24 are alternatively or angularly circumferentially spaced relative to the roller bearing elements 32 and 34 positioned and engaged in the raceways on the opposite sides thereof.

Thus, at all times, there is a substantially equal distribution of load bearing and supporting elements between the inner and outer race members 12 and 14.

Referring now to FIG. 5, the roller shaped bearing element there shown is generally identified by the numeral 40. Its construction is such that it is elongated in length and of substantially equal diameter at the opposite ends of its length. When utilized in the bearing construction as shown in FIGS. 1 and 2 in place of the dumbbell roller bearing elements, its function is the same. The diameter of the roller bearing element 40 must be and is equal to the diameter of the ball bearing element 28 and, therefore, equal to the spacing between the race surfaces with which the same engages between inner and outer race members 12 and 14. However, because the roller bearing element 40 is of substantially equal diameter at the opposite ends of its length and extends across from one opposite raceway to the other, less of such load bearing or ball bearing elements 28 are able to be included in the overall antifriction bearing structure 10 than if the dumbbell shaped roller bearing elements 30, 32, 34 as shown in FIG. 3 were employed Referring now to FIG. 6, there is shown a pair of disconnected roller bearing elements 32a and 34a. Each such element corresponds to the roller shaped elements 32 and 34 of FIG. 3 to function in the same manner and are constructed in the same manner as previously described, except, however, that they are disconnected from each other and, therefore, roll independently. Hence, when the roller elements 32a and 34a are utilized, they may be caged in the spacer structure 38 to roll alongside of or in alternate spaced circumferential relationship with the ball elements 28 engaged in the middle raceway.

From what has been described, it will be clear that the present invention will support greater stresses and produce a longer lasting antifriction bearing than prior known devices. In known antifriction bearings exemplified by those previously mentioned having eight rollable elements, such known devices will apply a stress to the outer race member or ring at the same point during each revolution. This stress will occur or be applied eight times for each revolution of the rollable elements, assuming the outer race is stationary. In the present invention, the same point of stress during each such similar revolution will be only four times, irrespective of whether the inner or outer race member be stationary. This results from the alternate arrangement of bearing elements in the races. Hence, although the same number of eight rollable elements may be used in each race, as in the prior art, the distribution of stresses is divided between a greater number of bearing elements for the same perior of rotation. Thus, the life of the antifriction bearing device 10 is increased without loss of load capacity, since both ball and roller elements will support radial loads, while the ball elements will support axial or thrust loads.

While there have been shown and described and pointed out the fundamental novel features of the invention as applied to several preferred embodiments thereof, it will be understood that various omissions and substitutions and changes in the form and details of the devices illustrated and in their operations may be made by those skilled in the art, without departing from the spirit of the invention. It is the intention, therefore, to be limited only as indicated by the scope of the claims appended hereto.

I claim:

1. An antifriction bearing comprising inner and outer race rings,
   each of said rings having a plurality of bearing surfaces each of which is aligned with a respective bearing surface of the other of said rings to provide a plurality of sets of aligned bearing surfaces.
   a set of ball bearing elements engaging one of said sets of aligned bearing surfaces,
   the cross-section of the one set of bearing surfaces being curver to a portion of the curvature of said ball bearing elements engaging the same,
   a set of roller bearing elements engaging another of the sets of aligned bearing surfaces,
   one of said bearing surfaces having a radial wall engaged by said roller bearing elements,
   said roller bearing elements each being cooperable with said radial wall to permit skewing of said roller bearing elements relative to said radial wall without binding,
   said ball and roller bearing elements each having equal diameters,
   said ball bearing elements constantly engaging said one set of the aligned bearing surfaces in spaced relation with said roller bearing elements that are constantly engaging the other of said sets of aligned surfaces,
   and means positioned directly between said ball and roller bearing elements and said rings to retain the bearing elements in loose spaced relation to each other between said rings.

2. An antifriction bearing comprising an inner race member having a plurality of race surfaces of equal diameter,
   an outer race member having a plurality of race surfaces of equal diameter,
   said race surfaces of said inner race member being radially aligned with respective race surfaces of said outer race member to define a plurality of sets of equal diameter raceways therebetween,
   a set of spherical elements constantly engaging the surfaces of one set of said raceways to support radial and axial loads applied to said race members, the surfaces of said one set conforming to a portion of the curvature of the spherical elements engaging the same,
   and a set of roller elements constantly engaging the surfaces of a respective different one of said sets of raceways to support radial loads applied to said race members,
   certain of said surfaces of said different set of raceways having a radial wall cooperable with said roller elements to permit skewing of the same relative thereto,
   said spherical and roller elements each being of equal diameter and being alternately positioned between and relatively angularly spaced from each other,
   and spacer means between said alternately positioned spherical and roller elements to retain the same loosely relatively spaced from each other to permit said roller elements to skew.

3. In an antifriction bearings,
   a plurality of sets of rollable bearing elements,
   a plurality of sets of radially aligned and relatively axially spaced races each for constant engagement with a respective set of rollable bearing elements,
   said rollable bearing elements each being of substantially the same diameter,
   the rollable bearing elements of one of said sets being arranged in alternate circumferential relation with the rollable bearing elements of at least another of said sets,
   spacing means positioned circumferentially between said sets of races,
   said spacing means caging each one of said one of said sets of rollable bearing elements and spacing each one of said one set of rollable bearing elements in their alternate circumferential arrangement to permit said other set of rollable bearing elements to skew.
   certain of said surfaces of the raceways for the respective other set of bearing elements having a radial wall cooperable with said respective bearing elements to permit skewing of said bearing elements without binding,
   and the surfaces of the raceway for said respective one set of bearing elements being in conforming relationship with its respective bearing elements to support radial and axial loads.

References Cited

UNITED STATES PATENTS

| | | | |
|---|---|---|---|
| 997,920 | 7/1911 | Keiper | 308—212 |
| 1,877,486 | 9/1932 | Brownlee | 308—212 |
| 1,420,852 | 6/1922 | Lofstrom | 308—213 |
| 2,581,722 | 1/1952 | Simmons | 308—200 |
| 3,131,006 | 4/1964 | Anderson | 308—180 |

EDGAR W. GEOGHEGAN, *Primary Examiner.*

FRANK SUSKO, *Examiner.*